(12) United States Patent
Ordentlich et al.

(10) Patent No.: US 6,995,769 B2
(45) Date of Patent: Feb. 7, 2006

(54) SYSTEMS AND METHODS FOR COMPRESSING RASTERIZATION SETUP DATA WITHIN A SORT MIDDLE GRAPHICS ARCHITECTURE

(75) Inventors: Erik Ordentlich, Palo Alto, CA (US); Craig M Wittenbrink, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 442 days.

(21) Appl. No.: 10/104,504

(22) Filed: Mar. 21, 2002

(65) Prior Publication Data

US 2003/0179195 A1    Sep. 25, 2003

(51) Int. Cl.
*G06F 13/14* (2006.01)
(52) U.S. Cl. ............... 345/520; 345/502; 345/504; 345/505; 345/506; 345/555; 345/556
(58) Field of Classification Search ............... 345/423, 345/502, 504, 506, 505, 419, 520, 555, 556; 382/232
See application file for complete search history.

(56) References Cited

U.S. PATENT DOCUMENTS 6,008,820 A * 12/1999 Chauvin et al. ............ 345/502
6,532,012 B2 * 3/2003 Deering ..................... 345/423
6,628,836 B1 * 9/2003 Wittenbrink et al. ....... 382/232

* cited by examiner

*Primary Examiner*—Kimbinh T. Nguyen

(57) ABSTRACT

A sort middle graphics architecture comprising a host interface for receiving raw primitive data from a graphics application; a geometry processing module coupled to the host interface for receiving the raw primitive data from the host interface and generating sort middle traffic data, said geometry processing module a having a built-in compression module for compressing the sort middle traffic data; and a rasterization module coupled to the host interface for receiving the compressed sort middle traffic data and rasterizing the data, said rasterization module having a built-in decompression module for decompressing the sort middle traffic data before it is rasterized.

20 Claims, 7 Drawing Sheets

SHARED EDGE

SYSTEMS AND METHODS FOR COMPRESSING RASTERIZATION SETUP DATA WITHIN A SORT MIDDLE GRAPHICS ARCHITECTURE

FIELD OF THE INVENTION

The present invention relates generally to systems and methods for processing image data. More particularly, the invention relates to a sort middle graphics architecture where the rasterization setup data is compressed and decompressed within the graphics architecture.

DESCRIPTION OF THE RELATED ART

Modern computer systems have become increasingly graphics intensive. Dedicated special purpose graphics systems have been developed to handle graphics intensive applications. The majority of graphics systems are built to accelerate the standard graphics throughput. Typical internal graphics system buses run at 200 MHz, and can sustain transfer rates of 800 Mbytes/second. As graphics applications are designed to increase the geometry throughput, the internal buses must also be designed to match the higher throughput. For example, a 2× increase in the throughput of the geometry processing requires a 2× increase in the number of internal buses or a 2× increase in the clock rate.

FIG. 1 is a simplified block diagram of a prior art sort middle graphics architecture 10 having a host interface 12, a series of geometry processing modules 14a–b, and a series of rasterization modules 16a–b. The geometry processing modules 14a–b are daisy-chained in a point to point configuration and are coupled to each other and the host interface 12 via Blitzen input bus lines (BIBs) 18a–b and Blitzen output bus lines (BOBs) 22a–b. The geometry processing modules 14a–b each include a float to fixed point data format module 20a–b for converting the output from the geometry processing module from floating point format into a fixed point data format. The host interface 12, also known as a Heathrow system, is typically connected to a host system (not shown) that is configured to run a graphics application which provides raw primitive data, defining a triangular space, and image qualities within that space.

The raw primitive data is converted from model coordinates to screen coordinates and processed by the geometry processing modules. The processed data is often referred to as sort middle traffic data or rasterization setup data and includes plane equations which define the screen space triangle vertices and pixel characteristics within these vertices.

The sort-middle traffic data is then sent from the geometry processing module 14a–b to the rasterization module 16a–b. The sort-middle traffic data is transmitted to the rasterization modules via the BOBs 22 and the RidgeLine bus lines 24. Generally, the BIBs, the BOBs, and RidgeLine bus lines are all architecturally similar, with the BIBs and the BOBs implementing subsets of the RidgeLine bus functionality. Typically, all the buses are clocked at the same frequency, which is around 200 Mhz, and they are each normally 40 bits wide, with the BIBs using only 32 bits. Also, all the buses are point to point buses with source sync clocking. The 40 bits (indexed from 0 to 39) include address and data information. In actuality, the buses may have more than 40 bits, with the remaining bits being reserved for control and handshaking purposes.

For the transfer of the sort middle traffic data or rasterizer set up data from the geometry processing modules to the rasterization modules, bit 39 is typically reserved in order to indicate that sort middle traffic data is being transferred (as opposed to a generic memory or register read/write operation). This leaves 39 bits for data and address information. In this situation, bits 32 to 38 will ordinarily specify the type of plane equation, and bits 0 to 31 will represent the actual data.

FIG. 2 illustrates a flow chart which shows the normal operation of a prior art sort middle graphics architecture. As shown, an application running on the host system defines a primitive or triangular space within a frame and determines primitive vertex data for the vertices of the triangular space along with setup variables which define associated texture coordinates, texture maps, z-depth, color, and other material properties of the pixels within the triangle (202). Preferably, the vertices of a primitive are typically floating point values made up of thirty-two bits. Under a typical graphics pipeline protocol, there are n bits, indexed from zero to n−1, in a word containing the values. The setup variables may are also typically represented as floating point values. For example, the z depth may be represented as forty bits, while color components may be represented as twenty-four bits.

The primitive data is then transmitted from the host interface to the geometry processing modules via the Blitzen input buses (204). Before the primitive data is transmitted, the host interface assigns the primitive data to one of the geometry processing modules for processing. Typically, the primitive data is assigned to one of the geometry processing modules through a round robin assignment process.

Once the primitive data arrives at the assigned geometry processing module 14, the geometry processing module performs viewing transformations (i.e. transforms the vertices for the triangle into screen space coordinates), lighting calculations at the vertices, and initial setup and computation of slopes for use by the rasterization modules (206). As explained above, the output from the geometry processing modules is referred to as sort middle traffic data or rasterization setup data and it includes a plurality of plane equations These plane equations are the starting values and slopes for all of the parameters of the primitive or triangular space.

As shown in FIG. 1, each geometry processing module includes a float/fixed module 20 configured to convert the floating point data to fixed-point data. The sort middle traffic data is converted from floating to fixed point format (208) and then transferred back across to the host interface over the BOBs (210).

From the host interface, the data is sent over the RidgeLine bus 24 to the rasterization modules 16, which perform rasterization and texture mapping (212). The rasterization modules are configured to perform the rasterization and are scan-lined interleaved, which means that all the sort middle traffic data is sent to each of the rasterization modules.

Images rendered from a large number of triangles can create fundamental bottlenecks at various points in the system; thus slowing down performance. For example, transfer of large amounts of raw primitive data to the geometry processing modules over the BIBs creates a bottleneck as well as transfer of the sort middle traffic data from the geometry processing modules to the rasterization modules. One approach to alleviating these bottlenecks has been to compress the raw primitive data which passes from the application to the geometry processing modules. This reduces traffic at the front end of the system; however, because the rasterization modules still require a fill set of plane equations for each primitive triangle, this does not address bottlenecks which occur as the sort middle traffic data is passed to the rasterization modules.

Accordingly, what is needed is a method for reducing the bottleneck which results from passing the plane equations or sort middle traffic data from the geometry processing modules to the rasterization modules.

SUMMARY OF THE INVENTION

A graphics pipeline in which the sort middle traffic data or rasterization set up data is compressed before it is transferred to the rasterization module and then decompressed when it is received by the rasterization module before the rasterization takes place, thereby reducing the amount of data transferred between the geometry processing modules and the rasterization modules and eliminating any bottlenecks which might have occurred during such transfer.

The pipeline includes a host interface, a plurality of geometry processing modules, and a plurality of rasterization modules which in concert process a graphical image produced by a graphics application. A compression module is also implemented in each of the geometry processing modules in order to compress the rasterization set up data or sort middle traffic data before it is transferred to the rasterization modules. Each of the rasterization modules is also equipped with a decompression module in order to decompress the data and obtain a full set of plane equations for each graphics primitive before the data is rasterized.

One advantage of having the geometry compression and geometry decompression modules implemented as part of the graphics pipeline instead of within the host interface is that no changes to the application program interface (API) are required, thus making the graphics pipeline independent of which API is used. Furthermore, more precise knowledge can be utilized from the screen space than the world space so compression of the screen space plane equations does not detract from the image quality.

DETAILED DESCRIPTION OF PREFERRED EMBODIMENTS

Figure 3:
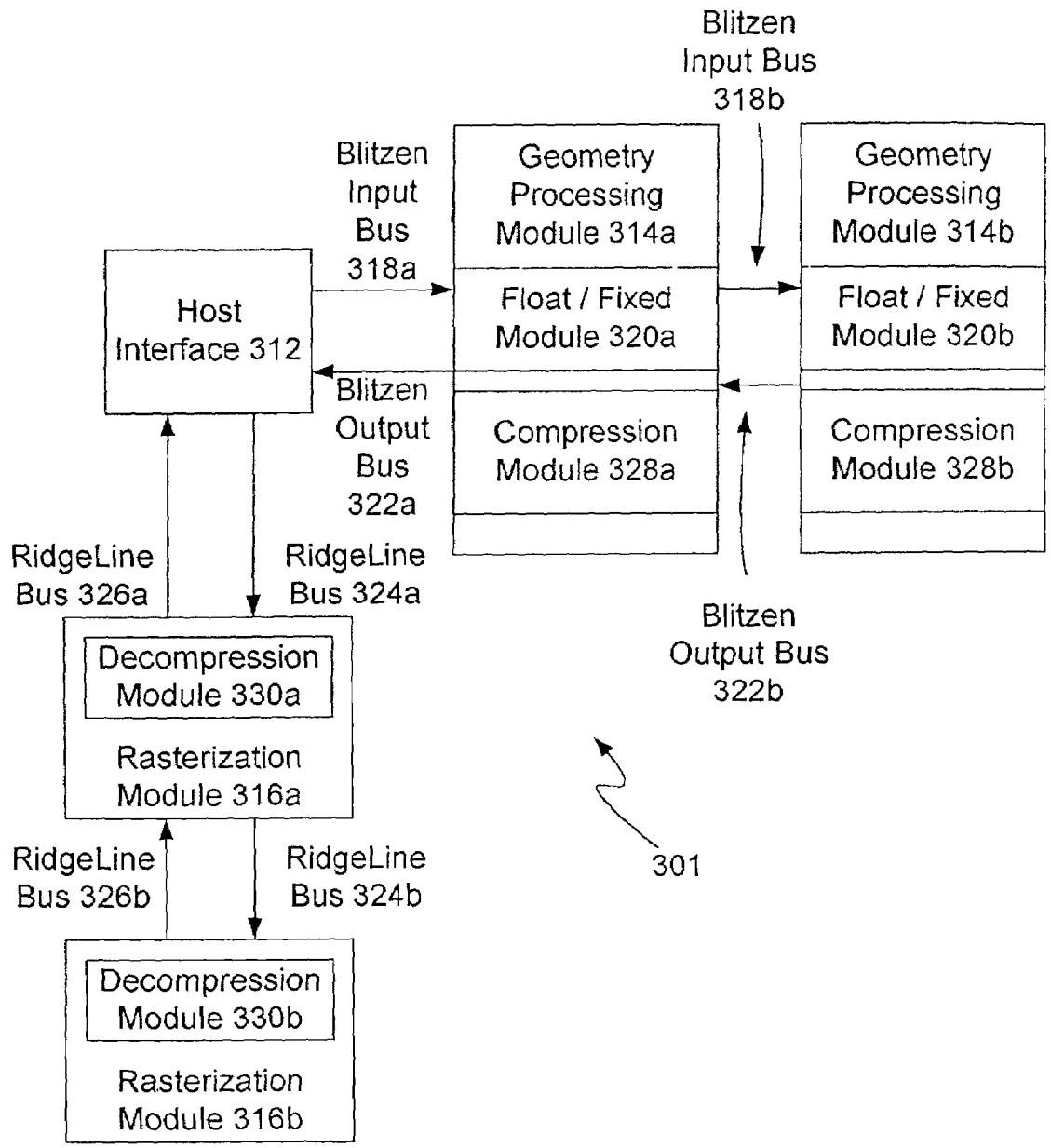
FIG. 3 is a simplified block diagram illustrating a sort middle graphics architecture having a compression module and a decompression module in accordance with a preferred embodiment of the present invention.

In this description, preferred embodiments of the present invention are described in greater detail with references to the above-described figures. FIG. 3, illustrates a simplified block diagram of a sort middle graphics architecture 301 in accordance with a preferred embodiment of the present invention. As shown, the sort middle graphics architecture 301 includes a host interface 312, a plurality of geometry processing modules 314a–b, and a plurality of rasterization modules 316a–b, which in concert process data for a graphical image produced by a graphics application running on the host interface. The geometry processing modules are coupled to the host interface via Blitzen input and output bus lines, 318 and 322 respectively. The rasterization modules are also coupled to the host interface via RidgeLine bus lines 324a–b and 326a–b.

As further illustrated in FIG. 3, a compression module 328a–b is implemented in each of the geometry processing modules in order to compress the rasterization set up data or sort middle traffic data before it is transferred to the rasterization modules. Each of the rasterization modules is also equipped with a decompression module 330a–b in order to decompress the data and obtain a full set of plane equations for each graphics primitive before the data is rasterized. Preferably, the compression modules are implement as part of the geometry processing modules, and operate to compress the sort middle traffic data before it is transferred to the rasterization modules. The decompression modules are preferably implemented within the rasterization modules. Alternatively, the compression and decompression modules may be separate modules in the process flow or image processing pipeline.

In a preferred embodiment, the compression modules are configured to efficiently remove redundant information and compress the rasterization set up data or plane equations before they are transferred to the rasterizer modules. The compression modules may be configured to perform any type of lossless or lossy compression method which is known in the art. Lossless compression refers to compression that results in no modification to the sort middle traffic data and has no effect on the quality of the final image once it is rendered. Lossless compression also refers to encoding of the setup variables to establish that the rendered output generated from the encoded data is bit-wise identical to that generated from the original data. Unused and redundant data are prime candidates for lossless compression because this data is selectively eliminated. Thus, portions of the data that are unused or redundant and have no effect on the rendered output are removed by the compression modules. For example, if two triangles share a common vertices, each vertex is represented by a separate plane equation. However, a lossless compression method will allow the coordinates for this vertex to be compressed into a single set of coordinates which need only be transmitted once.

Figure 4:
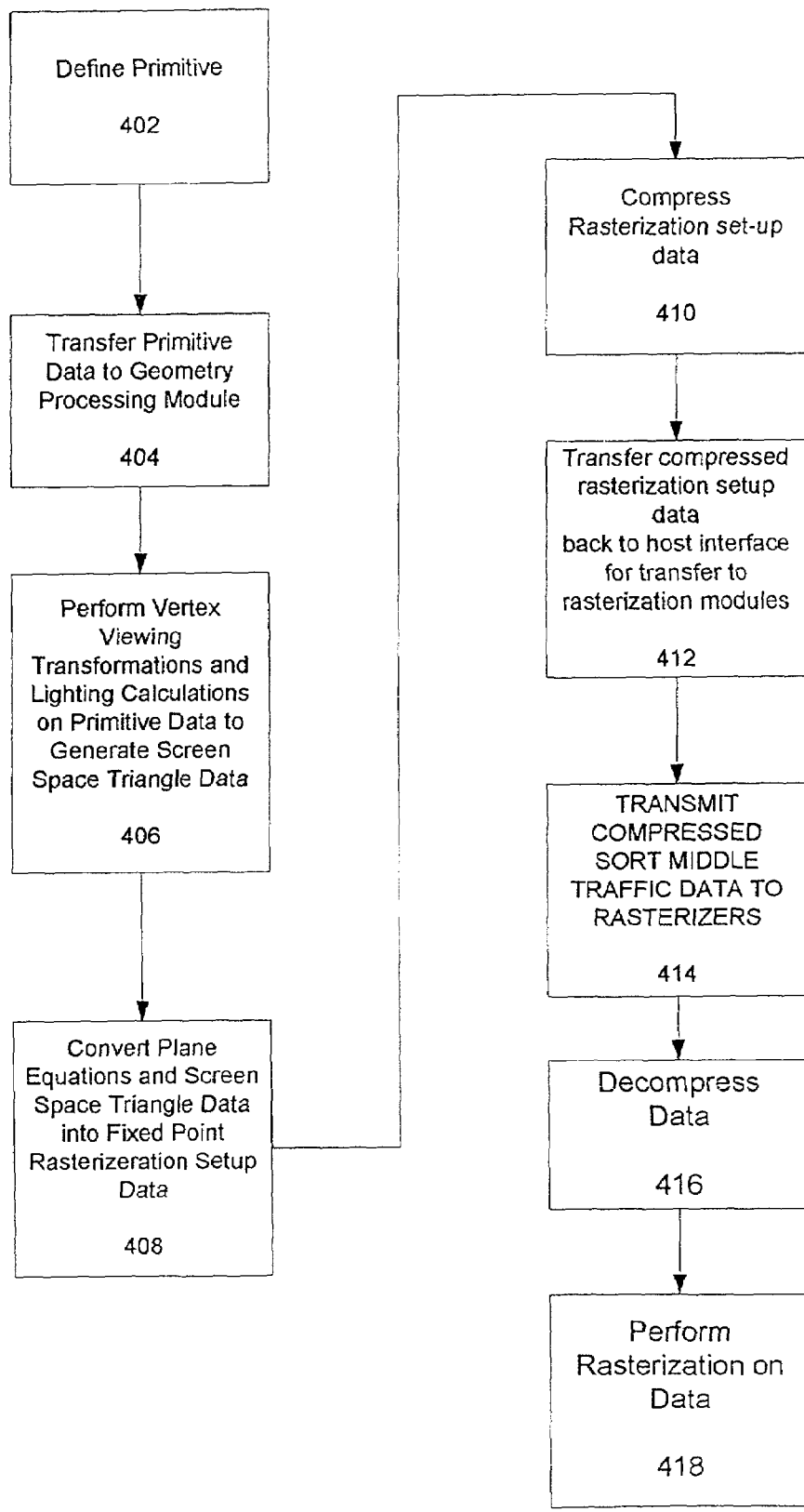
FIG. 4 illustrates a flow chart which shows the operation of the sort middle graphics architecture in accordance with a preferred embodiment of the present invention.

FIG. 4 illustrates a flow chart which shows the operation of the sort middle graphics architecture in accordance with a preferred embodiment of the present invention. As shown, an application running on the host system produces graphics images to be rendered. Each graphics image is defined by a plurality of primitives or triangular spaces within the frame. The application determines primitive vertex data for the vertices of the triangular spaces along with setup variables which define associated texture coordinates, texture maps, z-depth, color, and other material properties of the pixels within each triangle (402). Preferably, the vertices of a primitive are floating point values made up of thirty-two bits. The setup variables are also preferably represented as floating point values. For example, the z depth may be represented as forty bits, while color components may be represented as twenty-four bits.

The primitive data is then transmitted from the host interface to the geometry processing modules via the Blitzen input buses (404). Before the primitive data is transmitted, the host interface assigns the primitive data to one of the geometry processing modules for processing. In a preferred embodiment, the primitive data is assigned to one of the geometry processing modules through a round robin assignment process.

Once the primitive data arrives at the assigned geometry processing module, the geometry processing module performs viewing transformations (i.e. transforms the vertices for the triangle into screen space coordinates), performs any clipping or culling of the data, performs lighting calculations at the vertices, and performs initial setup and computation of slopes for use by the rasterization modules (406). The output from the geometry processing modules are called plane equations or rasterization setup data. These plane equations include starting values and slopes for all of the parameters of the primitive or triangular space.

As shown in FIG. 3, each geometry processing module preferably further includes a float/fixed module 320 configured to convert these plane equations from a floating point data format into a fixed-point data format. Accordingly, the plane equations are converted from floating to fixed point format (408). The fixed point plane equations or rasterization setup data are then compressed using the compression modules in the geometry processing modules (410). The compressed rasterization setup data or middle sort data is then transferred back across to the host interface over the BOBs (412).

From the host interface, the compressed rasterization set up data or compressed plane equations are sent over the RidgeLine bus lines to the rasterization modules, where they are then decompressed (414). Each of the rasterization modules includes a decompression module and the data is decompressed after it is received from the geometry processing modules via the host interface (416). The rasterization modules preferably then perform standard rasterization and texture mapping techniques which are known in the art (418). The rasterization modules preferably scan-lined interleaved, which means that all of the compressed rasterization set up data is sent to each of the rasterization modules.

As explained above, the compression modules within the geometry processing modules may be configured to perform any one of or numerous different kinds of compression techniques known in the art. Among these are:

Removal of Constant Color Data

One type of compression method which may be utilized is often referred to as constant color. This technique may be used where all of the pixels or a fraction of the pixels in the triangle edges are flat shaded as indicated by zero values for all of the six color slope plane equations. Constant color compression may eliminate this redundancy, the compression module determines whether any of the bits that represent the color slope plane equations (denoted by dR_dx, dG_dx, dB_dx, dR_dE1, dG_dE1, and dB_dE1) is zero (flat shading) and if so, the compression module does not transmit the data for these six plane equations for processing by the rasterization module. In this way, the slope values can be eliminated for the triangle in question. Under constant color, hundreds of bits are eliminated in exchange for one bit. For an image containing hundreds or thousands of constant color primitives, the total savings is substantial.

Delta Coding the Data

Another compression method which may be utilized is referred to as delta coding. Delta coding refers to several techniques that represent the data as a difference between successive vertices in the triangle rather than the actual data for each pixel. This compression method is preferably used when the triangle is predominantly small in size. The method includes selecting an anchor coordinate value in each of the x and y directions, calculating the differences between the anchor coordinate and the other two coordinates in each of the x and y directions, and encoding the differences. After computing the four differences, these differences are then further encoded using a known encoding technique, such as an adaptive Golomb coding technique. Since the difference between pixels is likely to be zero or very small in a very small triangle, the six coordinate values can be compressed for the triangle in question. Using delta coding, over hundreds of bits may be typically be eliminated in exchange for multiple, e.g., four, compressed differences. For an image containing hundreds or thousands of primitives, the total savings is substantial.

Edge Sharing

Figure 5:
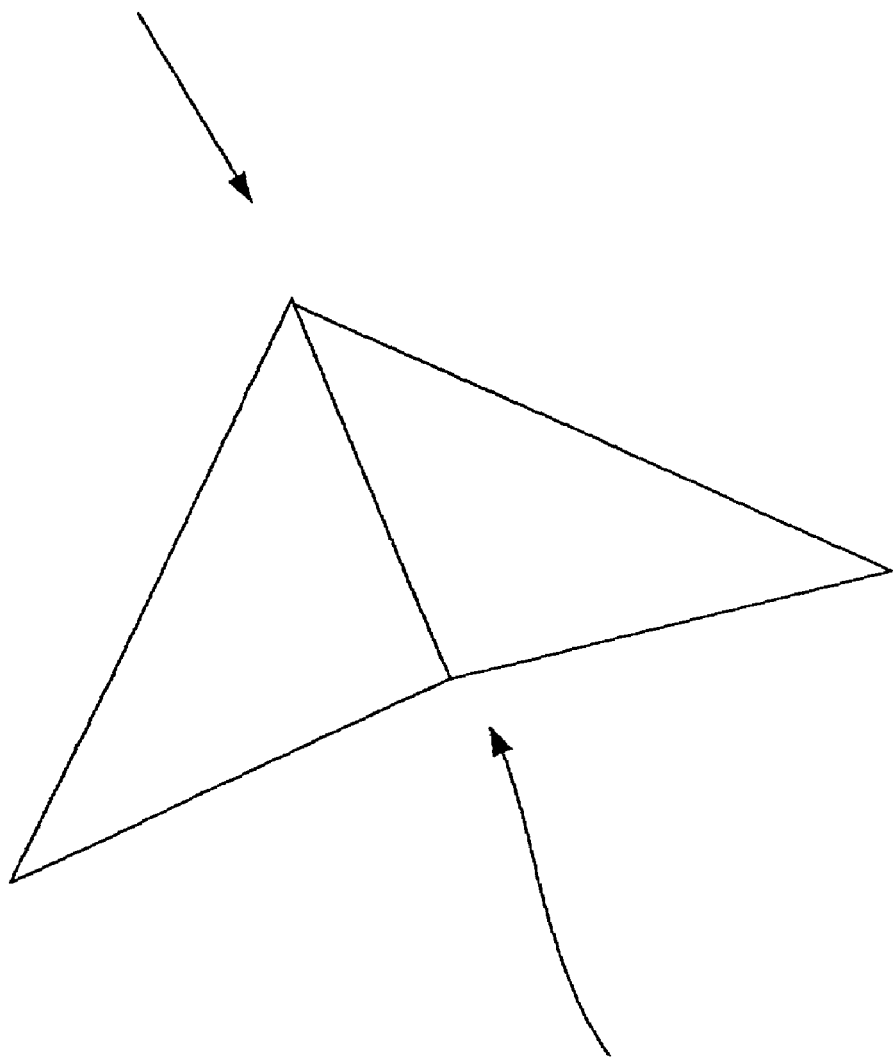
FIG. 5 is a drawing of two triangles having a shared edge which illustrates a situation in which an edge sharing compression method may be utilized.

Another example of a compression method which may be utilized in the present invention is known as edge sharing compression. FIG. 5 depicts a situation in which edge sharing compression may be used. As show, the compression method referred to as edge sharing can be utilized by the compression modules when two triangles have a common or shared edge. Typically, consecutive triangles in the traces often share an edge. Therefore, certain plane equations for the second triangle can be derived from the first triangle. The compression module handles this redundancy by using a bit to specify whether any of the edges of the current triangle are shared by the previous triangle. In this example, since there are two triangles, nine possible shared edge combinations exist. Which of these combinations actually occur is indicated using four bits. When a shared edge is detected, 2 y coordinates, 1 x coordinate and 1 edge slope of the current triangle are derived from corresponding plane equations for the shared edge of the previous triangle. Hence, these plane equations can be eliminated from the sort middle traffic data of the current triangle. Under edge sharing, hundreds of bits will be eliminated in exchange for four bits. For an image containing hundreds or thousands of shared edge primitives, the total savings is substantial.

Slope Coding

Another geometry compression method, referred to as slope coding, can be utilized by the compression modules when a very high degree of precision of the edge slopes is not necessary. In a preferred embodiment, each color slope has an integer portion and a decimal or fractional portion. Each portion is represented by a number of bits—for example, 8 bits may be used to represent the integer portion and 8 bits may be used to represent the decimal or fractional portion. When the color slope is very small, i.e. less than one, the integer portion is represented by 8 zero bits. When this occurs, instead of transmitting all 8 zero bits, a single bit may be used instead to represent the integer portion of the slope as being zero. For an image containing literally hundreds to thousands of small slope edges, the total savings is substantial and under a slope coding method, many bits may be eliminated.

Color Quantization

Another method of eliminating the redundant data and reducing the sort-middle traffic is to eliminate information that does not significantly degrade the data. Once such geometry compression method, referred to as color quantization, can be utilized by the compression modules to eliminate information when these start and slope values are more precise than necessary. For example, color quantization eliminates information that does not significantly degrade the data. During color quantization, the resolution of the floating point color is quantized to a fixed point color within an error of ¼ bit. The color quantization of the floating point color to the fixed point color has some error, but the error is minimized by using larger bit fixed point number (a fixed point number having more bits—i.e. 24 bits per color).

The color quantization method includes identifying when a triangle is substantially smaller than the visible display area and quantizing the start and slope setup variables to integer values such that the precision varies with the primitive size and ensures a maximum error of a predetermined portion of a gray level throughout each rasterized primitive. For example, the gray level error may be chosen to be ¼, ⅛, ¹⁄₁₆, etc. In this way, the precision of the nine start and slope setup values can be tailored for the triangle in question. It should be noted that a ¼ gray level error may introduce distortion into the rendered output relative to the uncompressed rendered output. However, this error is sufficiently small so as to be imperceptible in the final output. Compression ratios for color quantization alone maybe as high as 1.8. However, using color quantization together with lossless compression and triangle culling, the compression ratios may increase to between 3.1 to 4.4.

Even though the rasterization modules quantize the colors to integer gray levels, the ¼ gray level error may introduce distortion in the rendered output, relative to the original rendered output, since, obviously, two full precision gray levels can be quantized to distinct (but adjacent) integer gray levels no matter how close they are to each other. A maximum error of ¼ in internally computed gray levels is sufficiently small as to be imperceptible in the final output obtained by quantizing to integer values.

The following analysis derives the plane equation precisions as a function of the final error and the number of times slopes are accumulated, which is related to the size of the triangle. The rasterization modules compute the color of any pixel according to the formula $$c = c_0 + N_e c_e + N_x c_x,$$

where $c_0$ is the starting color value, $c_e$ is the dcolor/dedge parameter, $c_x$ is dcolor/dx, and $N_e$ and $N_x$ are respectively the number of times $c_e$ and $c_x$ are accumulated to obtain c. If the parameters $c_0$, $c_e$ and $c_x$ are approximated by $\hat{c}_0$, $\hat{c}_e$ and $\hat{c}_x$, the error in the final color value is $$|c - \hat{c}| = |c_0 - \hat{c}_0 + N_e(c_e - \hat{c}_e) + N_x(c_x - \hat{c}_x)|$$
$$<= |c_0 - \hat{c}_0| + N_e|c_e - \hat{c}_e| + N_x|c_x - \hat{c}_x|$$
$$= \varepsilon_0 + N_e \varepsilon_e + N_x \varepsilon_x,$$

where $\epsilon_0 = |c_0 - \hat{c}_0|$, $\epsilon_e = |c_e - \hat{c}_e|$, and $\epsilon_x = |c_x - \hat{c}_x|$ are the errors in the approximation of the parameters. If $R_k$ (k=0, e, x) fractional bits are used to approximate $c_k$, then $\epsilon_k = 2^{-(Rk+1)}$. Thus, given a final error tolerance of $\epsilon$, $R_0 + R_e + R_x$ is minimized subject to $$2^{-(R0+1)} + N_e 2^{-(Re+1)} + N_x 2^{-(Rx+1)} <= \epsilon.$$

The minimum is achieved when $R_0 = -\log_2(\epsilon/3) - 1$, $R_e = -\log_2(\epsilon/(3N_e)) - 1$, $R_x = -\log_2(\epsilon/(3N_x)) - 1$, and $\epsilon = ¼$.

Figure 6:
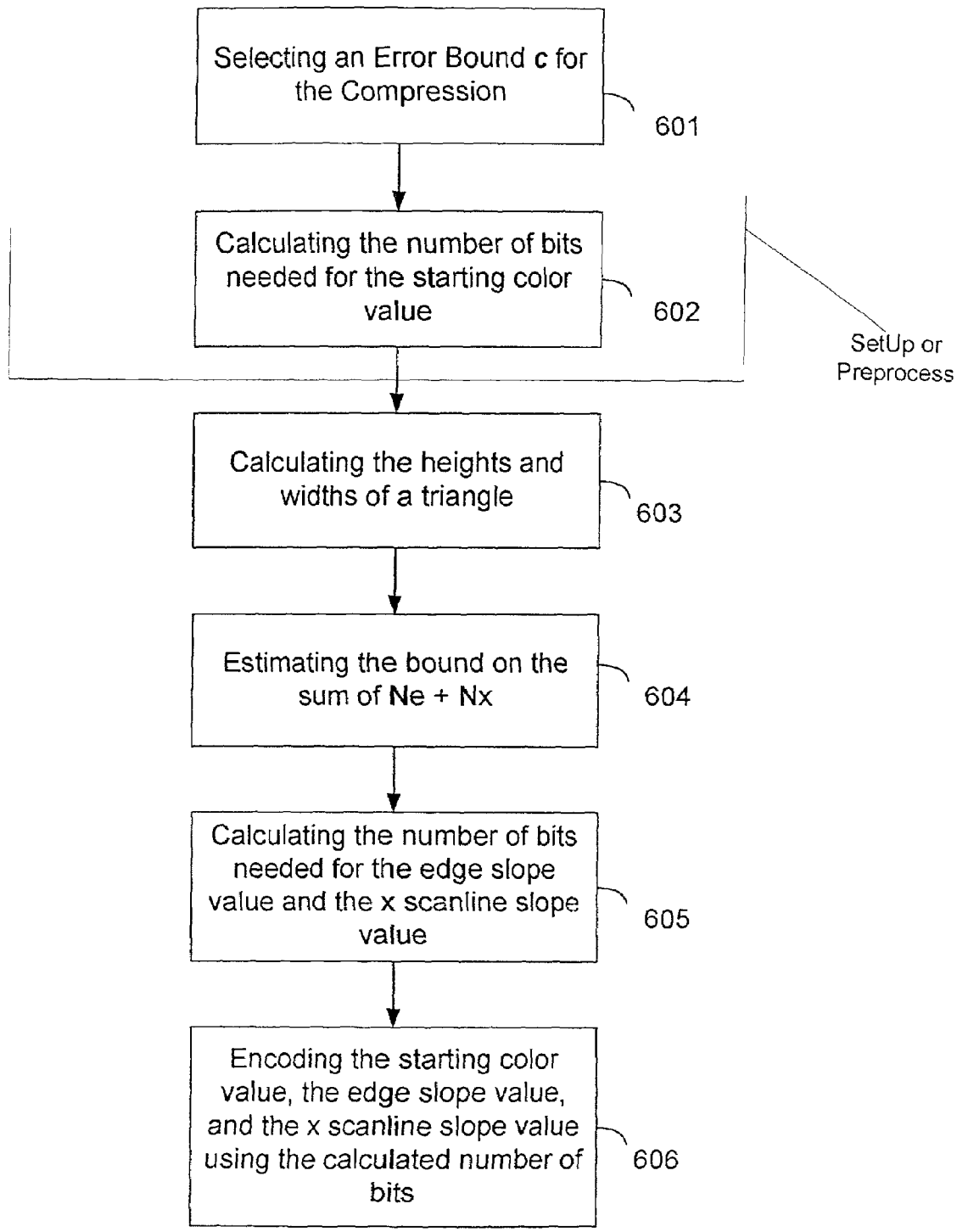
FIG. 6 is a flow diagram of a color quantization graphics compression method according to one embodiment of the present invention.

FIG. 6, illustrates a flow diagram of the process for a color quantization graphics compression method according to one embodiment of the present invention. The process includes a setup which is preferably completed as a preprocess at the time of the implementation of the hardware or firmware. The process begins at block 601, when the compression module is configured to select an error bound c for the compression. At block 602, the compression module is configured to calculate the number of bits needed for the starting color value. At step 603, the heights and widths are calculated for each triangle. These include the absolute height of the triangle, the height of the triangle from its widest point, the width of the triangle at its widest point, and the absolute width of the triangle. However, depending on the bound used in the next block of the process, all four of these may not be needed. At step 604, the process estimates the bound on the sum of $N_e + N_x$, where $N_e$ is the number of times $c_e$ (the dcolor/dedge parameter) is updated and $N_x$ is the number of times $c_x$ (the dcolor/dx parameter) is updated. At step 605, the process calculates the number of bits needed for the edge slope value and the x scanline slope value. Finally, at block 606, the process encodes the starting color value, the edge slope value, and the x scanline slope value using the calculated number of bits.

Under color quantization, unnecessary precision bits are eliminated. More bits are typically used for z and fewer bits for color. Possible candidate setup variables for color quantization include color (red, green, and blue), opacity (alpha), depth (z), texture variables, and normals. For an image containing hundreds or thousands of small primitives, the total savings is substantial.

Additional Compression/Encoding Techniques

It is understood that the present invention may be configured to use anyone of numerous types of known compression techniques, including transform or predictive coding techniques. These techniques may involve variable length encoding which would require additional capabilities be built-into the geometry processing modules. For example, retrieving words from a packet of variable length encoded data might require multiplexors and checking. Checking for zero-pixel triangles and converting slopes to quadrant format might require comparators or additional microcode. Accordingly, it is understood that each geometry processing module will be further configured to handle the specific type of compression technique utilized within that module.

Additionally, predictive coding has been used extensively in image compression and is used primarily to exploit correlation between adjacent pixels. Predictive coding predicts the value of a given pixel based on the values of the surrounding pixels. Due to the correlation property among adjacent pixels in an image, the use of predictive coding can reduce the amount of information bits required to represent that image. In modern image compression algorithms, especially for the lossless case, prediction coding is often the best performing coding model. Some good examples of predictive coding techniques are Binary Tree Predictive Coding (BTPC), Fast Efficient Lossless Image Compression System (FELICS), and Low Complexity Context-Based Lossless Image Compression Algorithm (LOCO-I). These techniques may be used in co-operation with other compression techniques such as context-modeling and statistical coding such that the prediction error values from predictors are coded and the resulting compression ratios are very efficient. It is understood that some predictive coding techniques may require arithmetic operations at both the encoder and decoder. Accordingly, the geometry processing modules and the rasterizers may be configured to include comparators, microcode, and multiplexors, and additional buffers.

In addition to compressing the data before transferring it to the rasterization modules, the geometry processing modules may also be preferably configured to perform additional techniques for reducing the data including culling the data and/or removing unused or redundant fields. Each of these additional techniques is described in greater detail hereinafter.

Culling Data

Figure 1:
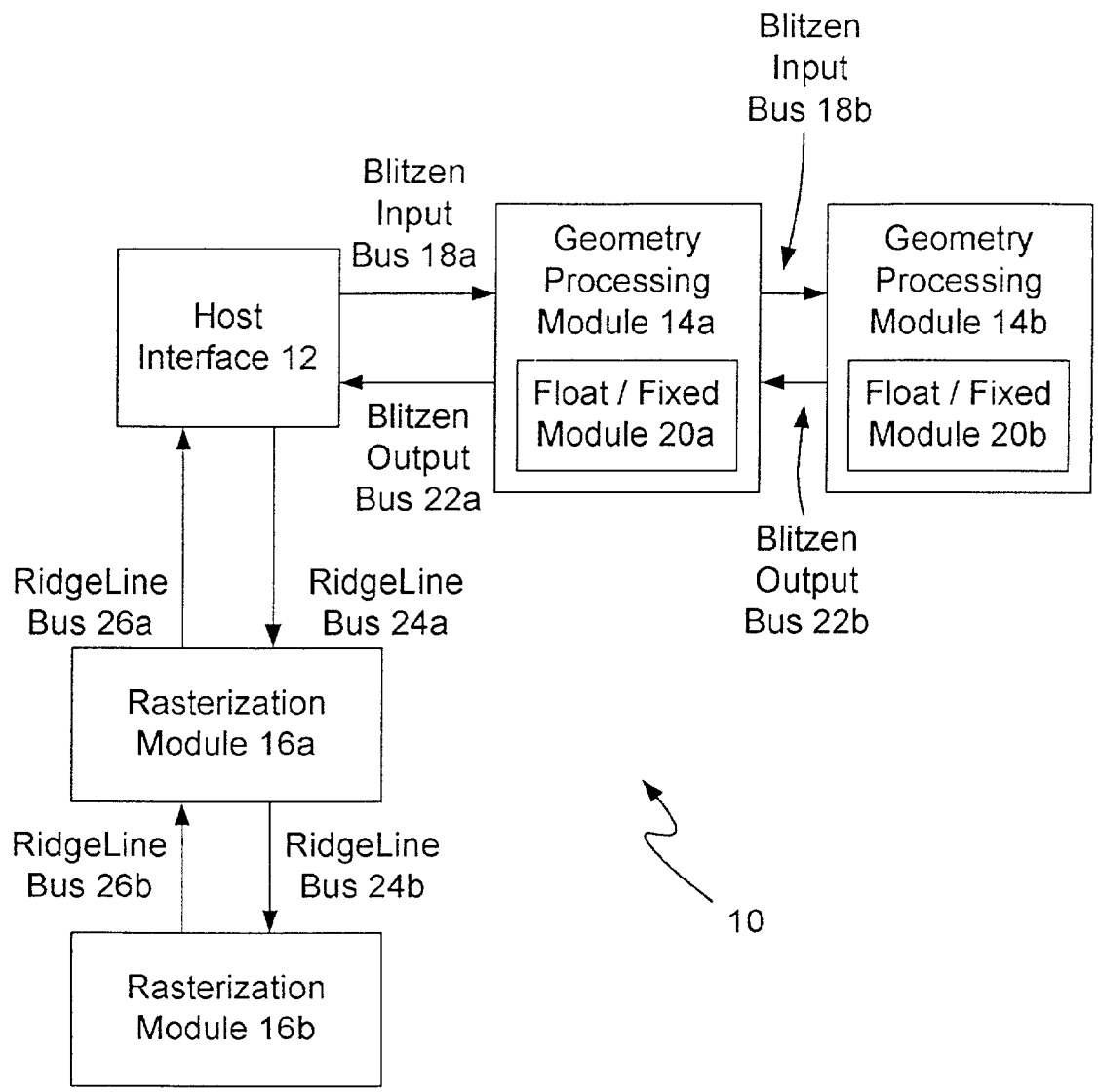
FIG. 1 is a simplified block diagram of a prior art sort middle graphics architecture having a host interface, geometry processing modules, and rasterization modules.
Figure 2:
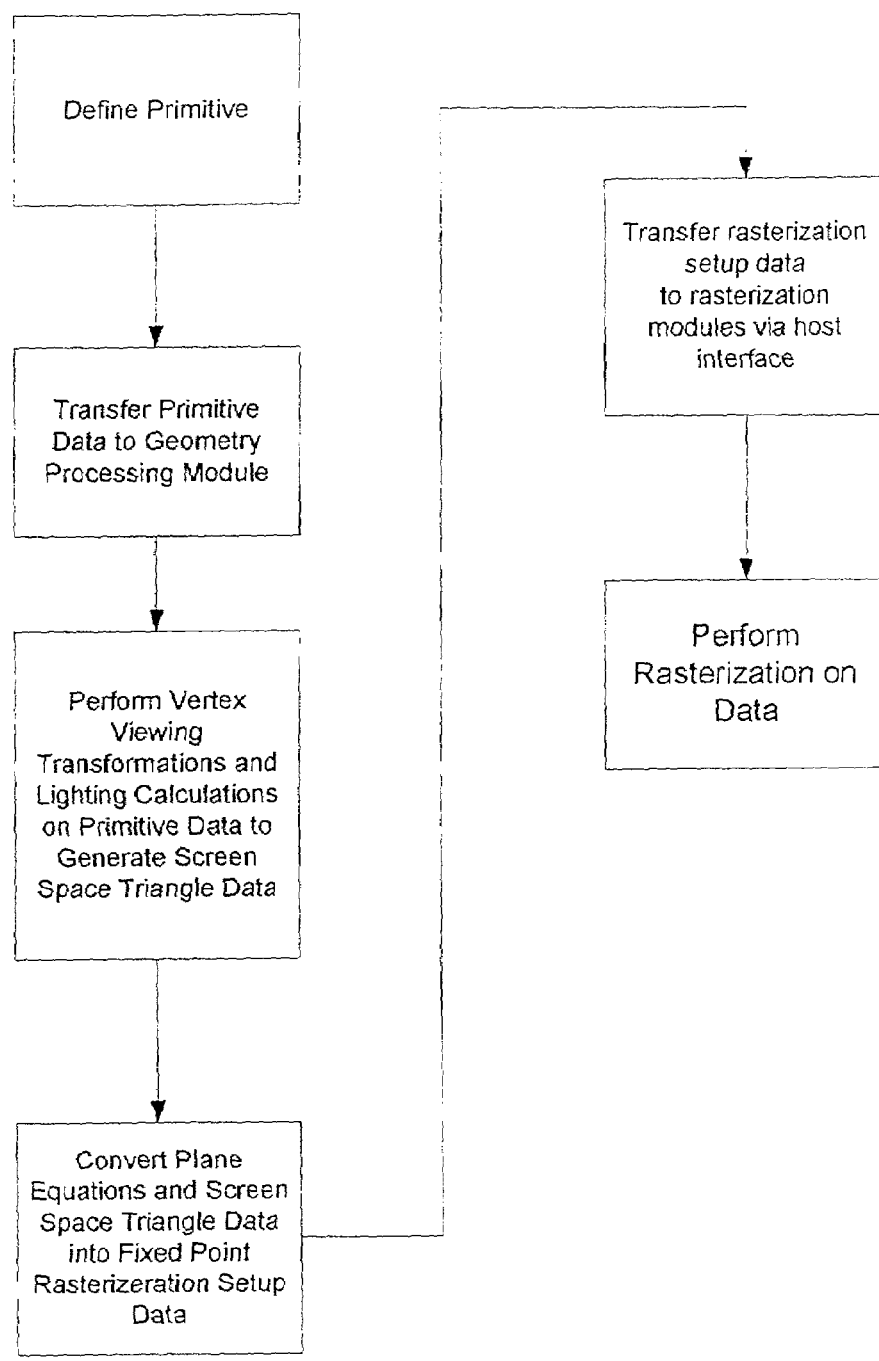
FIG. 2 illustrates a flow chart which shows the normal operation of a prior art sort middle graphics architecture.
Figure 7:
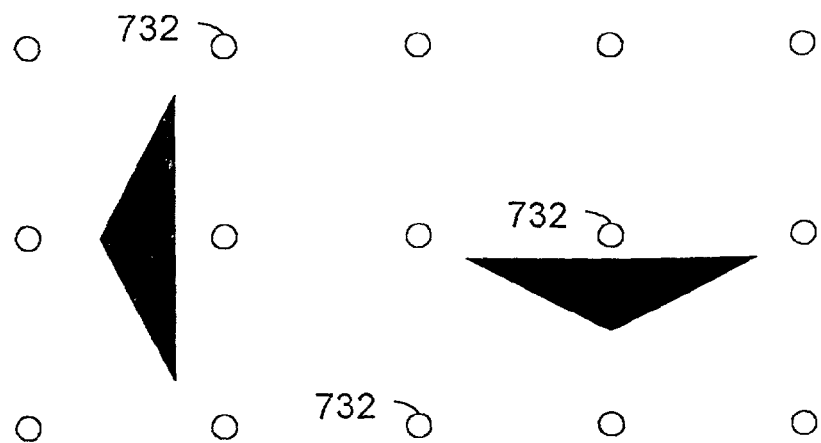
FIG. 7 is a diagram that illustrates when a technique for culling data for zero pixel triangles may be utilized.

Many redundancies exist in the plane equation data. One method of eliminating the redundant data and reducing the sort-middle traffic is by culling data that is not used during rasterization by the rasterization modules. FIG. 7 is a diagram that shows two zero-pixel triangles falling between pixel centers 732 that can be culled. For example, each circle 732 in FIG. 2 can be referred to as a pixel center. A simple test that locates many of the zero-pixel triangles is to test whether the bounding box of a triangle falls between the pixel centers. If so, the triangle data may be eliminated or culled without effecting the rendered output, when anti-aliasing is not in effect. This is referred to as zero-pixel triangle culling. Hence, these small triangles can be tested and culled before they are sent across the RidgeLine bus 324 to the rasterization module 316.

A related redundancy is the case of single pixel triangles, or triangles which contain only a single pixel center. These triangles are converted to points, thereby eliminating the need for much of the plane equation data. Only the coordinates of the resulting point and color and other parameter values are transmitted. Slope and vertex information (aside from that needed to describe the point) can be culled. Similarly, triangles containing only two pixel centers can be converted to vectors. Culling data is data set and view dependent.

Removing Unused or Redundant Fields and Data

Another method of eliminating the redundant data and reducing the sort-middle traffic is by eliminating the redundant data by encoding the data, which might include eliminating the type fields, sending only the fixed point precision that is used in rasterization, changing slopes to quadrant representation, and encoding differences in coordinates. Therefore, unused or redundant fields and bits are eliminated. This is also referred to as full packing. The method includes defining a packet type corresponding to a setup variable type, identifying the type of setup variables, and bundling the setup variables into a packet of the corresponding packet type. Each packet includes a header and setup variables in a predefined order. In this way, the type field for each individual setup variable is eliminated. The actual savings will depend on the situation, but the number of additional bits of the header is substantially less than the number of bits eliminated for all of the type fields for the setup variables. Under full packing, over 100 bits are eliminated in exchange for the header bits. For an image containing hundreds or thousands of primitives, the total savings is substantial.

Among the setup variables generated by geometry processing is a group of six slope values that specify two slope values for each of the primary colors, i.e., red, green, and blue. The slope values are added to the starting value to compute the color of each pixel falling inside the triangle. The slopes roughly specify the change in each color per horizontal and vertical pixel distance. However, these slope values may not be necessary in some applications. For example, these slope values are not necessary when the triangle exhibits flat shading as indicated by zero values for all six slope values.

In prior art methods, 7 bits of each 40 bit address/data transfer are used to specify the plane equation type. This provides flexibility, as primitives can incorporate any of the plane equation types. However, the 7 bits, i.e., the type field, are redundant and can be eliminated since the great flexibility it affords is not necessary.

Figure 8A:
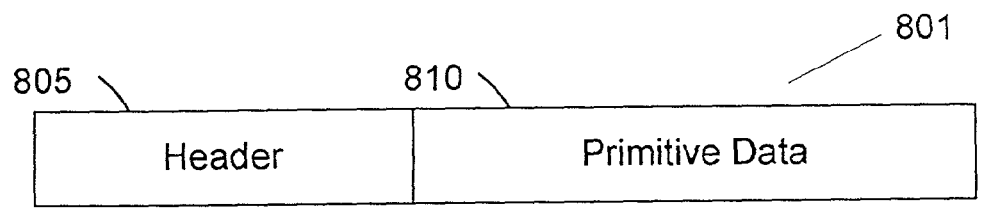
FIG. 8A shows a packet having a type field and data and FIG. 8B shows a plurality of packets wherein the type field is removed.
Figure 8B:
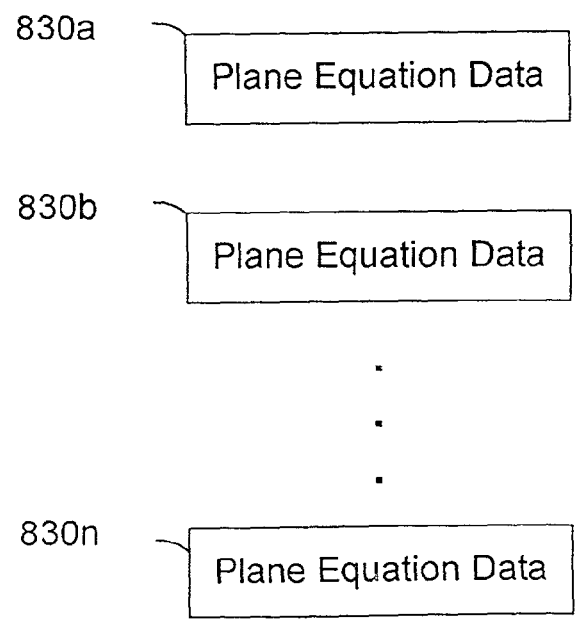

FIG. 8A shows a packet 801 having a type field header, 805 and primitive data 810, and FIG. 8B shows a plurality of packets having plane equation data 830a–n bundled therein. The type field typically identifies the type of data equation being sent in each patent. Because the hardware has only a few primitives, lines, points, triangles, etc. and a few rendering modes, texture mapping on/off, fog on/off, etc., only a small number of packet types are defined. A short header, along with a fixed order for transmitting the plane equations within each packet, allows the rasterization modules to identify and extract the plane equations from the packet data. Packet headers can be encoded according to their frequency of transmission, using Huffman coding, or a RISC instruction set like design.

To eliminate the 7 bits per transfer that are freed by removing the header, the sort middle traffic data is packed into the 39 bit (1 bit of the 40 is reserved to identify a plane equation) bus transfers on bit boundaries, with some plane equation data necessarily extending across bus transfers. This-bit-wise packing of data applies to all of the compression techniques considered. This basic optimization translates into some additional hardware complexity, as it implies the need for circuitry which can read and write arbitrary portions of a bitstream, at individual bit offsets. Other superfluous bits that can be eliminated are the extra precision bits for some plane equations that are ignored during rasterization.

We describe techniques to achieve lossless and lossy compression of RidgeLine bus traffic. The methods can be used individually or in combination. The dramatic reduction in traffic through zero-pixel triangle culling, as well as the good compression with small hardware impact, make these important alternatives to increasing the bus rate or bus width for the sort middle graphics architecture. The specific examples of geometry compression disclosed above included full packing, constant color, delta coding, edge sharing, slope coding, and color quantization. Taken individually, each represents a substantial savings. It should also be noted that the techniques can be combined for even greater savings overall. Taken in combination, compression ratios as high as two to one have been achieved. This represents far more efficient utilization of the special purpose memories and hardware of the sort middle graphics architecture.

The decompression modules 330 are configured to decompress and reproduce the compressed primitive data. As with the compressor modules the decompressor modules are configured to decompress the data in accordance with any method or technique which may be known in the art.

The foregoing detailed description of the present invention is provided for the purposes of illustration and is not intended to be exhaustive or to limit the invention to the precise embodiment disclosed. Several embodiments of the graphics architecture have been described that are provided for the purposes of illustration and are not intended to be exhaustive or to limit the invention to the precise embodiment disclosed. The embodiments may provide different capabilities and benefits depending on the configuration used to implement the sort middle graphics architecture. Accordingly, the scope of the present invention is defined by the following claims.

What is claimed is:

1. A sort middle graphics architecture comprising:
    a host interface for receiving raw primitive data from a graphics application;
    a geometry processing module coupled to the host interface for receiving the raw primitive data from the host interface and generating sort middle traffic data, said geometry processing module having a built-in compression module for compressing the sort middle traffic data; and
    a rasterization module coupled to the host interface for receiving the compressed sort middle traffic data and rasterizing the data, said rasterization module having a built-in decompression module for decompressing the sort middle traffic data before it is rasterized.

2. The sort middle graphics architecture of claim 1, wherein the geometry processing module further includes a floating to fixed point data conversion module for converting the sort middle traffic data from a floating point format into a fixed point format before the data is compressed.

3. The sort middle graphics architecture of claim 1, wherein the built-in compression module compresses the sort middle traffic data using a constant color compression method.

4. The sort middle graphics architecture of claim 1, wherein the built-in compression module compresses the sort middle traffic data using a delta coding compression method.

5. The sort middle graphics architecture of claim 1, wherein the built-in compression module compresses the sort middle traffic data using a slope coding compression method.

6. The sort middle graphics architecture of claim 1, wherein the built-in compression module compresses the sort middle traffic data using a color quantization compression method.

7. A method for processing graphics data for an image to be rendered, said method comprising:
    receiving raw primitive for an image to be rendered;
    utilizing a geometry processing module in order to process the raw primitive data and generate sort middle traffic data;
    compressing the sort middle traffic data and then transmitting the compressed sort middle traffic data to a rasterization module; and
    decompressing the sort middle traffic data and rasterizing the decompressed sort middle traffic data.

8. The method of claim 7, wherein the sort middle traffic data is converted from a floating point format into a fixed point format before the data is compressed.

9. The method of claim 7, wherein the data is culled before it is compressed.

10. The method of claim 7, wherein the sort middle traffic data is compressed using a constant color compression method.

11. The method of claim 7, wherein the sort middle traffic data is compressed using a delta coding compression method.

12. The method of claim 7, wherein the sort middle traffic data is compressed using a slope coding compression method.

13. The method of claim 7, wherein the sort middle traffic data is compressed using a color quantization compression method.

14. A computer program product for causing a geometry processing module, coupled to a host interface, to receive raw primitive data from the host interface and generate sort middle traffic data for an image to be rendered, said computer program product causing the geometry processing module to perform the following steps:
    receive raw primitive for an image to be rendered;
    generate sort middle traffic data; and
    compress the sort middle traffic data and then transmit the compressed sort middle traffic data to a rasterization module.

15. The computer program product of claim 14, wherein the computer program product causes the geometry processing module to convert the sort middle traffic data from a floating point format into a fixed point format before the data is compressed.

16. The computer program product of claim 14, wherein the computer program product causes the geometry processing module to perform a culling operation on the sort middle traffic before the data is compressed.

17. The computer program product of claim 14, wherein the computer program product causes the geometry processing module to compress the sort middle traffic data using a constant color compression method.

18. The computer program product of claim 14, wherein the computer program product causes the geometry processing module to compress the sort middle traffic data using a delta coding compression method.

19. The computer program product of claim 14, wherein the computer program product causes the geometry processing module to compress the sort middle traffic data using a slope coding compression method.

20. The computer program product of claim 14, wherein the computer program product causes the geometry processing module to compress the sort middle traffic data using a color quantization compression method.

* * * * *